United States Patent Office 3,032,255
Patented May 1, 1962

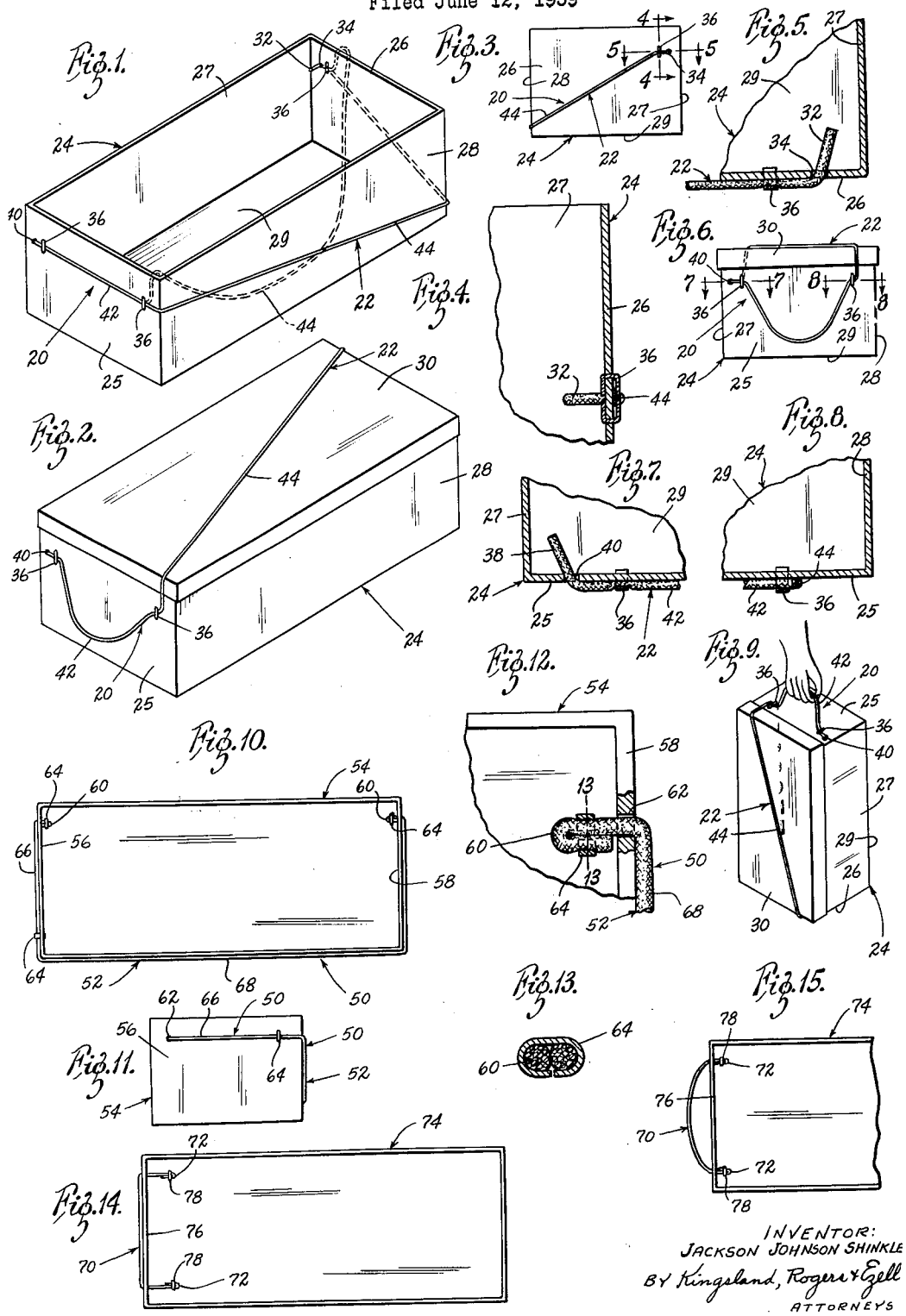

3,032,255
BOX CARRYING AND CLOSING ARRANGEMENT
Jackson Johnson Shinkle, 1904 N. Geyer Road,
St. Louis, Mo.
Filed June 12, 1959, Ser. No. 820,035
2 Claims. (Cl. 229—46)

The present invention relates generally to carrying means for boxes which combines the function of maintaining a movable lid in place while the box is being carried thereby. More particularly, the present invention is concerned with a novel cord arrangement mounted upon an open box which can be moved into position to provide a carrying handle and to maintain a lid in closed position.

In brief, the present invention comprises a cord of predetermined length which is permanently attached to a box in a manner to permit movement lengthwise thereof in predetermined manner. Considering a shoe box, for example, one end of a reach of cord is stapled to an end of the box with the free end of the cord pushed into the box; similarly, the other free end of the cord is stapled to the other end of the box in opposed relation to the first end of the cord with the free end pushed through an opening into the interior of the box. A third staple is located at one end of the box and traps the cord in a manner to permit sliding longitudinal movement thereof backwards and forwards therethrough. The cord is of a length to fit over the lid of the box when placed in closed position and to provide a carrying loop between one end securing staple and the aforesaid third staple. A modification includes disposition of the free ends of the cord within the box through opposed openings in the ends, each free end of the cord being folded back and stapled within the box, the holes being too small to permit withdrawal of the cord when thus stapled. A simple carrying handle comprises a reach of cord having free ends thereof extending through openings in an end of the box into the interior thereof, the free ends being folded back and secured by staples, the staple ends being too large for withdrawal through the openings.

Therefore, broadly, an object of the present invention is to provide a novel box carrying and closure arrangement of simple form which is effective for the intended purposes when applied to boxes having movable lids, such as shoe boxes, and the like.

Another object is to provide a novel box carrying and closure arrangement which can be economically produced.

Another object is to provide a novel box carrying and closure arrangement which is susceptible of being produced in quantity at high speeds.

Another object is to provide a novel box carrying and closure arrangement which is sturdy in construction and neat in appearance, yet which incorporates a minimum of material, thereby being economical and competitive.

Another object is to provide a novel carrying handle which is of sturdy construction, which is lightweight, which requires no instruction or particular skill to place the same in carrying relation to the box on which it is installed, which is inexpensive both in respect to materials and in respect to manufacture, and which otherwise fulfills the objects and advantages sought therefor.

Another object is to provide a novel box carrying and closure arrangement which is light of weight and which is uncomplicated in respect to use by the consumer, requiring no instructions for manipulation, and which otherwise fulfills the objects and advantages sought therefor.

The foregoing and other objects and advantages are apparent from the following description taken with the accompanying drawing, in which:

FIGURE 1 is an isometric view of a shoe box incorporating the present invention;

FIGURE 2 is an isometric view of a shoe box with a top applied and the novel carrying and closure arrangement in operative relation thereto;

FIGURE 3 is an end view of the box shown in FIGURE 1, looking toward the right or far end thereof;

FIGURE 4 is an enlarged fragmentary, vertical cross-sectional view taken on substantially the line 4—4 of FIGURE 3;

FIGURE 5 is an enlarged fragmentary, horizontal cross-sectional view taken on substantially the line 5—5 of FIGURE 3;

FIGURE 6 is an end view of the box and lid shown in FIGURE 2, looking toward the left or near end thereof;

FIGURE 7 is an enlarged fragmentary, horizontal cross-sectional view taken on substantially the line 7—7 of FIGURE 6;

FIGURE 8 is an enlarged fragmentary, horizontal cross-sectional view taken on substantially the line 8—8 of FIGURE 6;

FIGURE 9 is an isometric view of the box and cover of FIGURE 2, illustrating it in carrying and top retaining relation;

FIGURE 10 is a plan view of a shoe box incorporating a modification of the present invention;

FIGURE 11 is an end view thereof, looking towards the right hand end of the box of FIGURE 10;

FIGURE 12 is an enlarged fragmentary view, partly in cross section, illustrating the folded back and stapled end of cord reach;

FIGURE 13 is a vertical cross-sectional view taken on substantially the line 13—13 of FIGURE 12;

FIGURE 14 is a plan view of a shoe box illustrating a further modification in the form of a novel carrying handle attached thereto, the ends of the carrying handle being disposed within the box; and FIGURE 15 is a fragmentary view similar to FIGURE 14, but with the carry cord extended for carrying of the box.

Referring to the drawing more particularly by reference numerals, 20 indicates generally one form of a box carrying and closure arrangement incorporating the teachings of the present invention, particular reference being made to FIGURES 1–9. The arrangement 20 includes a cord reach 22 mounted upon a box 24 having ends 25 and 26, sides 27 and 28, and a bottom 29. A top 30 is provided.

Particularly noting FIGURES 5 and 7, one free end 32 of the cord reach 22 extends into the box 24 through an opening 34 and is secured against the outer side of the box end 26 by a simple staple 36 which may be round or flat as desired. Similarly, the other end 38 of the cord reach 22 is inside the box 24, extending through an opening 40 in the box end 25. A simple staple 36 also secures the end 38 of the cord reach 22 against the outer surface of the box end 25.

A third simple staple 36 is secured to the box end 25 in transversely spaced relation to the staple 36 securing the cord end 38, as is clear from FIGURES 1 and 6, which traps the cord reach 22 intermediate its ends, thereby providing a handle segment 42 and a top securing segment 44. The third staple 36 permits sliding longitudinal movement of the cord reach 22 therethrough in order to dispose the cord segments 42 and 44 as desired. That is, the cord segment 42 is of maximum length when defining a carrying handle, as in FIGURES 2, 6 and 9, and the cord segment 44 is of maximum length when the cord reach 22 is in operative position, as in FIGURES 1 and 3.

It is manifest that the arrangement 20 is a simple, effective and economical box carrying and closure device which can be readily manipulated between the positions of FIGURES 1 and 2 of the drawing.

FIGURES 10–13 illustrate a modified box carrying and closure arrangement 50 which includes a cord reach 52 mounted on a box 54 having ends 56 and 58. Free ends 60 of the cord reach 52 extend through openings 62 in the box ends 56 and 58 into the box 54, and are folded back and secured by simple staples 64, which may be like the staples 36. Thus secured by the staples 64, the ends 60 cannot be withdrawn from the box. A third staple 64 is located in a position similar to that of the third staple 36 securing the cord reach 52 intermediate its ends 60 against the end 56 of the box 54, thereby providing a carrying cord segment 66 and a lid securing cord segment 68. The arrangement 50 functions in the same manner as the arrangement 20, hence, further detailed description thereof is unnecessary.

In FIGURES 14 and 15, there is shown a simplified carrying handle incorporating some of the features of the modified box carrying and closure arrangement 50. A short cord reach 70 has its free ends 72 within a box 74, extending through the openings in an end 76 thereof. The free ends 72 are folded back and secured by simple staples 78 in the manner of the free ends 60 above described. The cord reach 70 is shown in carrying position in FIGURE 15 and in inoperative position in FIGURE 14.

It is manifest that there have been provided novel box carrying and closure arrangements and a carrying arrangement which fulfill the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present inveniton which is limited only by the claims which follow.

What is claimed is:

1. In combination with a box having a closure top, a carrying and closure arrangement therefor, comprising said box, a cord reach, one end of said cord reach extending through one end of said box into the interior thereof, the other end of said cord reach extending through the other end of said box into the interior thereof, each cord reach end being folded back on itself for a short portion thereof, a staple securing each said folded back portion thereby preventing withdrawal thereof, and means dividing said cord reach into a box carrying segment and a box top securing segment.

2. In combination with a box having a closure top, a carrying and closure arrangement therefor, comprising said box, a cord reach, one end of said cord reach extending through one end of said box into the interior thereof, the other end of said cord reach extending through the other end of said box into the interior thereof, each cord reach end being folded back on itself for a short portion thereof, a staple securing each said folded back portion thereby preventing withdrawal thereof, said ends being disposed in substantially opposed relation, and means dividing said cord into a box carrying segment and a box top securing segment, said dividing means including a staple element secured to the box at one end in laterally spaced relation with the opening through which the cord extends into said box, said staple element permitting sliding therethrough of said cord.

References Cited in the file of this patent

UNITED STATES PATENTS

| | | |
|---|---|---|
| 744,138 | Walters | Nov. 17, 1903 |
| 1,927,706 | House | Sept. 19, 1933 |
| 1,975,453 | Fink | Oct. 2, 1934 |
| 2,260,951 | Mulnix | Oct. 28, 1941 |
| 2,772,045 | Pace | Nov. 27, 1956 |
| 2,837,266 | Sarnoff | June 3, 1958 |
| 2,922,566 | Wright | Jan. 26, 1960 |